3,395,091
PREPARATION OF METAL OXIDES BY REACTIVE SPUTTERING OF CARBIDES
William R. Sinclair, Summit, N.J., assignor to Bell Telephone Laboratories, Incorporated, New York, N.Y., a corporation of New York
Filed July 6, 1965, Ser. No. 469,476
4 Claims. (Cl. 204—192)

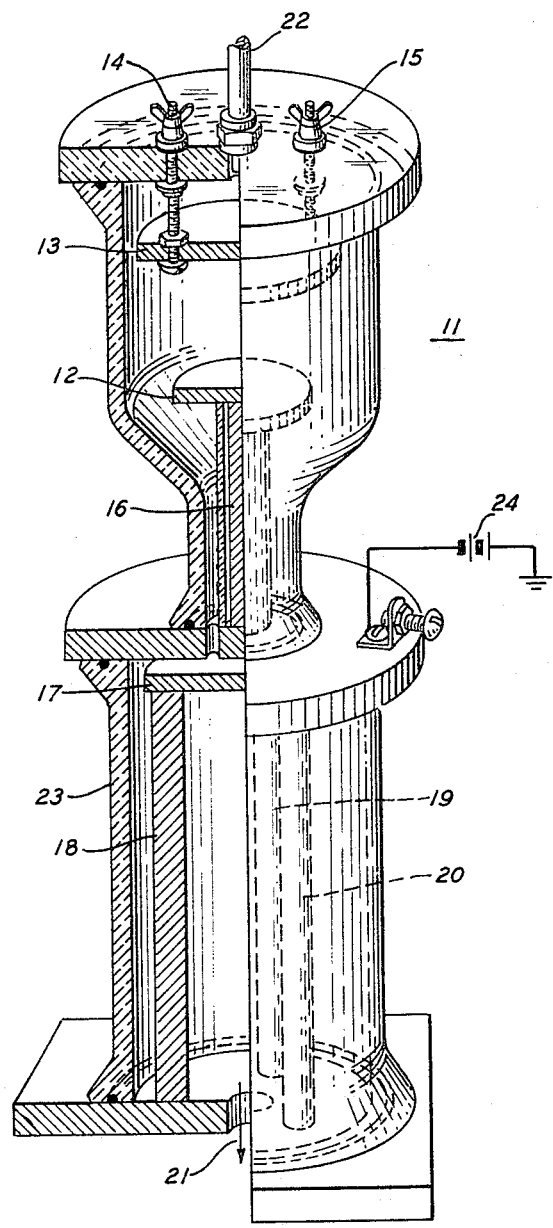

This invention relates to a technique for the preparation of metal oxide films by reactive sputtering of conductive metal carbides in the presence of oxygen.

In recent years, considerable interest has been generated in the development of techniques suitable for the preparation of metal oxide films. Among the more promising techniques considered is reactive sputtering. Unfortunately, this technique has failed to realize its ultimate potential, limitations being dictated either by the limited ability of certain elements to sputter or the inability to form a desired alloy for use as a sputtering electrode.

Accordingly, elements such as aluminum and chromium which sputter at a negligible rate in the presence of oxygen can only be obtained in the oxide form by alternative, and generally more costly, procedures. Similarly, barium titanium-mixed oxides and other oxide mixtures which are widely used in the electronics industry cannot be prepared by reactive sputtering due to the inability to prepare a barium-titanium alloy by any of the known techniques.

In accordance with the present invention, it has been determined that these limitations may be effectively overcome by reactive sputtering of conducting carbides in the presence of oxygen, so resulting in a carbon-free metal oxide film.

It will be appreciated by those skilled in the art that the main impact of the present invention lies in the discovery that certain metal oxide films not heretofore obtainable by sputtering techniques can now be so obtained, and additionally, resides in the discovery of an unobvious alternative technique for sputtering metal oxides.

The invention will be more readily understood from the following detailed description taken in conjunction with the accompanying drawing wherein:

The figure is a front elevational view, partly in section, of an apparatus suitable for use in producing a metal oxide film in accordance with the present invention.

With reference now more particularly to the drawing, there is shown an apparatus suitable for depositing metal oxide films in accordance with the invention. Shown in the figure is a vacuum chamber 11 in which are disposed cathode 12 and anode or substrate 13. Cathode 12 is composed of a conducting carbide of the material it is desired to sputter, that is, either an elemental conducting carbide or an alloy in carbide form.

The conducting carbides suitable in the practice of the present invention are well known to those skilled in the art and are grouped in two categories, saline and refractory. The physical properties and techniques employed for obtaining the carbides of inteerst are discussed by Barnett and Wilson in "Inorganic Chemistry," pages 276–279, 1953, Longman Green and Company.

Substrate 13 upon which the oxide film is to be deposited, is suspended from chamber 11 by means of support screws 14 and 15. Preferred substrate materials for the present invention are unglazed ceramics, metals, high temperature glasses, or any material which will withstand firing at temperatures of the order of 1000° C. and will not react with the sputtered layer to produce an undesired result.

Cathode 12, which may be either in disc or powder form, is connected to an aluminum support rod 16 by means of an aluminum screw (not shown), rod 16 being connected to aluminum plate 17 which is, in turn, connected to aluminum support rods 18, 19 and 20.

Provision is made for evacuating chamber 11 via conduit 21 and for introducing a mixture of oxygen and an inert gas or oxygen alone via conduit 22 during the sputtering process. Cathode 12 and anode or substrate 13, which are electrically insulated by means of Pyrex pipe 23, are biased by source 24.

In the operation of the process, vacuum chamber 11 is first evacuated, flushed with an inert gas, as, for example, any of the members of the rare gas family such as helium, argon or neon, and the chamber then re-evacuated. The extent of the vacuum is dependent upon consideration of several factors well known to those skilled in the art.

For the purposes of the present invention, it will suffice to state that the minimum pressure is determined by the lowest deposition rate which can be economically tolerated whereas the maximum pressure is that at which sputtering can be reasonably controlled within the prescribed tolerances. A practical upper limit is 10 microns of mercury for a sputtering voltage of 5000 volts.

After the system has been pumped down, oxygen or oxygen plus an inert gas, for example, argon, is admitted into the system via conduit 22. In this manner, the pressure is maintained within the range of 10 to 75 microns of mercury.

Next, cathode 12, which is composed of a conducting carbide of the type described above, is made electrically negative with respect to anode or substrate 13. The minimum voltage necessary to produce sputtering is of the order of 20 volts D-C. However, for the particular geometry utilized in describing the present invention, it is preferred to employ a sputtering voltage within the range of 500 to 2500 volts, a pressure of the order of 20 microns of mercury and a current within the range of 25 to 100 milliamperes. The proper balancing of these factors of voltage, pressure and current as well as relative positions of the cathode and anode are well known to those skilled in the art.

With reference now more particularly to the example under discussion, by employing a proper voltage, pressure and spacing of the various elements within the vacuum chamber, an oxidized film is deposited upon substrate 13. Sputtering is conducted for a period of time calculated to produce the desired thickness. For the purposes of the present invention, the thickness of the deposited layer ranges from 50 to 250,000 Angstroms, depending on the desired use.

Several examples of the present invention are described in detail below. The examples are included merely to aid in the understanding of the invention, and variations may be made by one skilled in the art without departing from the spirit and scope of the invention.

Example I

A sputtering apparatus similar to that shown in the figure was used to reactively sputter an amorphous film of aluminum oxide upon a 1" x 1" x 1 mm. fused silica substrate. The sputtering electrode was an aluminum carbide powdered electrode (powder poured into a fused silica cup in electrical contact with and covering an aluminum washer which is in contact with aluminum support rod 16 in the figure) obtained from commercial sources. In the apparatus employed, the anode was grounded, the potential difference being obtained by making the cathode negative with respect to ground.

The vacuum chamber was initially evacuated to a pressure of the order of $10^{-2}$ microns, oxygen admitted and re-evacuated to 20 microns of mercury with the oxygen flowing into the chamber.

The anode and cathode were spaced approximately 2"

apart and a D-C voltage of approximately 500 volts was impressed between cathode and anode.

Sputtering was conducted for 120 minutes producing an amorphous aluminum oxide coating, approximately 816 A. thick, upon the substrate.

Example II

A sputtering apparatus similar to that shown in the figure was used to reactively sputter a vitreous film of silicon oxide upon a glass substrate. The sputtering electrode was a silicon carbide disk obtained from commercial sources. The procedure employed in Example I was followed with the exception that a D-C voltage of 2250 volts was impressed between cathode and anode.

Sputtering was conducted for 125 minutes producing a vitreous silica coating, approximately 3175 A. thick, upon the substrate.

Example III

The procedure of Example I was repeated utilizing 5 tantalum carbide disks 100 mils in thickness and having an 0.5 inch diameter as sputtering electrodes. A D-C voltage of 2200 volts was impressed between cathode and anode and sputtering conducted for 120 minutes, so resulting in a 1220 A. thick coating of amorphous tantalum oxide.

Example IV

The procedure of Example I was repeated utilizing a hot pressed disk 100 mils in thickness and having an 0.5 inch diameter comprising a 1:1 mixture of barium and titanium carbides. A D-C voltage of 2000 volts was impressed between cathode and anode and sputtering conducted for 145 minutes, so resulting in an amorphous film of barium and titanium oxide, 810 A. thick upon the substrate.

Example V

The procedure of Example II was repeated utilizing a powdered chromium carbide powdered electrode. A D-C voltage of 1250 volts was impressed between cathode and anode and sputtering conducted for 130 minutes, so resulting in an amorphous film of chromium oxide 19,600 A. thick upon the substrate.

What is claimed is:

1. A method for the preparation of an oxide film selected from the group consisting of aluminum oxide, silicon oxide, tantalum oxide, titanium oxide, barium oxide, chromium oxide and mixtures thereof which comprises reactively sputtering the respective conducting carbide selected from the group consisting of aluminum carbide, silicon carbide, tantalum carbide, titanium carbide, barium carbide, chromium carbide and mixtures thereof in the presence of oxygen.

2. A method in accordance with the procedure of claim 1 wherein said oxide is aluminum oxide and said carbide is aluminum carbide.

3. A method in accordance with claim 1 wherein said oxide is silicon oxide and said carbide is silicon carbide.

4. A method in accordance with claim 1 wherein said oxide comprises a mixture of the oxides of barium and titanium and said carbide is a mixture of the carbides of barium and titanium.

References Cited

UNITED STATES PATENTS

| | | | |
|---|---|---|---|
| 1,926,336 | 9/1933 | Hunter | 204—192 |
| 2,239,642 | 4/1941 | Burkhardt et al. | 204—192 |
| 3,336,211 | 8/1967 | Mayer | 204—192 |

OTHER REFERENCES

Trans. Natl. Vac. Symposium. 10, pp. 309–15, 1963 (England).

ROBERT K. MIHALEK, *Primary Examiner.*